UNITED STATES PATENT OFFICE.

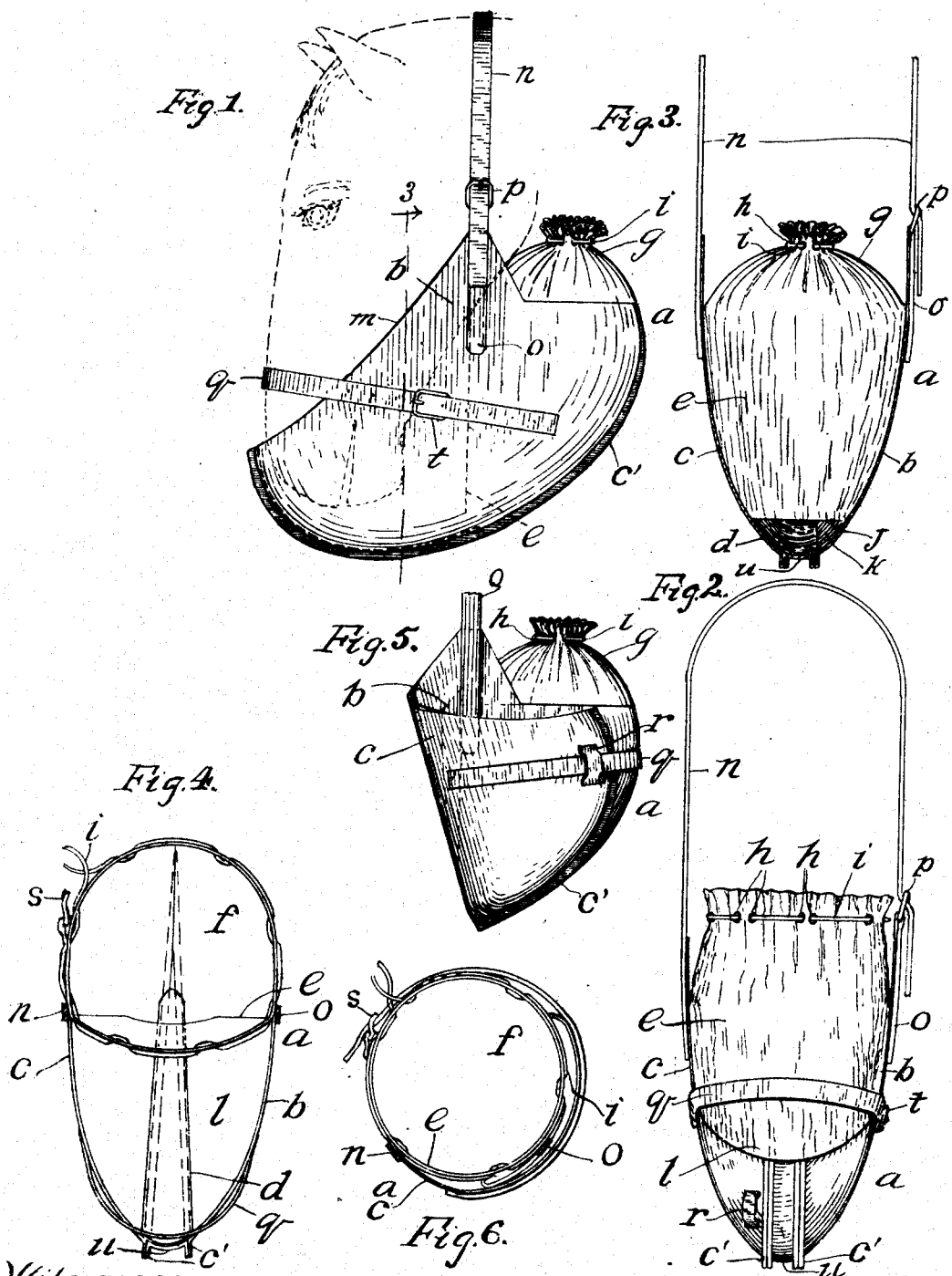

WILLIS J. RAYBURN, OF CHICAGO, ILLINOIS.

FEED-BAG.

No. 927,073.  Specification of Letters Patent.  Patented July 6, 1909.

Application filed January 11, 1909. Serial No. 471,637.

*To all whom it may concern:*

Be it known that I, WILLIS J. RAYBURN, a citizen of the United States, residing in Chicago, in the county of Cook and State of Illinois, have invented certain new and useful Improvements in Feed-Bags, of which the following is a specification.

This invention relates to that class of feed bags having two connected compartments, one adapted to contain feed, and the other to be supplied with feed from the feed-containing compartment and to admit the nose of a horse or other animal to be fed.

The principal object of the invention is to provide a simple, economical and efficient feed bag.

Further objects of the invention are to provide a feed bag having a feeding compartment and a feed-containing compartment adapted to communicate with the feeding compartment and supply feed or grain to the latter, the side walls being laterally flexible and adapted to enable the portion of the bag which forms the front or feeding compartment to be folded laterally into position to close the bottom opening of the rear or supply compartment or receptacle; to provide, in combination with said elements, a flexible element or strap adapted to engage the nose of the animal when the bag is in extended position or being fed from, and to encircle or partially encircle the supply compartment or feed containing receptacle or secure the walls of the feeding compartment in position to close the opening between the two compartments; to provide a bag having a feed-supply compartment and a feeding compartment communicating therewith, or having a feed-containing compartment open at top and bottom, with means for closing the top opening, and a body portion so constructed as to enable the bottom opening to be closed by the main body portion of the bag, and adapted to dispense with the use of additional elements such as a flap, gate, strap and buckle or the like, for said purpose.

A further object is to provide a main body portion formed preferably of a single piece and having the desired vertical and horizontal rigidity and transverse flexibility, and adapted to form a compact tightly closed receptacle when folded and to prevent the wasting of feed when in extended position, and also adapted to be readily filled while the bag is so folded as to close the bottom opening of the supply-compartment and prevent the feed from escaping into the feeding compartment or otherwise being wasted.

Other and further objects of the invention will appear from an examination of the following description and claims, and the drawings, which are made a part hereof.

The invention consists in the features, combinations and details of construction herein described and claimed.

In the accompanying drawings Figure 1 is a view in side elevation of a feed bag constructed in accordance with my improvements; Fig. 2, a front elevation of the same, with the feed-supply compartment open; Fig. 3, a transverse sectional view, taken on line 3 of Fig. 1, looking in the direction of the arrow; Fig. 4, a plan view of the feed bag shown in Figs. 1 and 2; Fig. 5, a side elevation of the bag in folded position, as it would appear when filled, and illustrating the use of the nose strap to hold the bag in folded position so as to close the bottom opening of the feed-supply receptacle; and Fig. 6, a plan view of the bag in folded position, with top open and the feed-supply receptacle ready to be filled.

In constructing a feed bag in accordance with my improvements I provide a main body portion $a$, formed preferably of a piece or pieces of fabric or similar material, such as strong, heavy canvas, and comprising side wall portions $b$ and $c$. The bottom edges of the canvas or material which forms this main body portion of the bag are folded into a sufficient number of preferably upright laps so as to form a forked reinforce or seam $c'$, which is preferably of greater dimensions vertically than transversely and therefore transversely flexible and relatively rigid vertically. An additional reinforce $d$ formed preferably of one or more thicknesses of canvas extends along the bottom of the bag from the front end back to a point adjacent to the front wall or partition $e$ of the feed-supply or feed-containing compartment or receptacle $f$. This partition or inner wall $e$ is formed preferably of relatively thin canvas and has its side edges sewed securely to the side walls $b$ and $c$ respectively, and the upper portion of the same piece of fabric which forms the partition $e$, or a piece of material of similar light material sewed thereto and to the upper rear portion of the main body of the bag forms a top $g$ for the feed-containing or supply compartment or receptacle $f$. Near the upper edge of this top portion of the receptacle $f$ and preferably held in place by means of rings $h$, is a flexible element such as a cord or strap $i$, which is mounted upon the cover portion $g$ of the feed-supply receptacle $f$ and adapted to be tightly drawn and wrapped around the top portion of said receptacle or cover so as to close the opening therein. This cord extends through the rings $h$ which are secured to the cover $g$ of the feed-supply receptacle in such a manner as to form a series of rings which encircles the top or opening in the upper portion of said receptacle. The bottom edge $j$ of the inner wall or partition $e$ is, throughout at least a portion of its length, disconnected from, or not secured to the main body portion of the bag. An opening or passage $k$ is thus provided at or near the bottom of the partition $e$, forming a connection between the lower portion of the feed-supply or rear compartment or reservoir $f$ and the forward or feeding compartment $l$.

The bottom of the bag extends downward and forward at an incline, the lowermost portion being that which forms the bottom of the forward or feeding compartment, and the bottom of the feed-supply compartment leading downward from the back of the bag at an incline to the forward compartment. The side walls of the forward or feeding compartment are a part of the main body portion of the bag, and the upper edges $m$ of this forward portion of the bag extend upward from the front end of the forward or feeding compartment at an incline to the top of the rear compartment which latter is considerably higher than the front end of the bag or of the feeding compartment. A strap $n$ is secured to the upper portion of the bag on one side, and a strap $o$, having a buckle $p$ is secured to the opposite side, both of said straps being preferably secured to the bag at a point slightly back of the partition $e$ so as to properly balance the bag and enable it to be suspended from the neck of an animal in such a position that the animal will be enabled to feed from the feeding compartment. The buckle $p$ may be secured to the bag in any ordinary or known manner, but preferably by means of a strap $o$, as above suggested, and being connected with the strap $n$, the buckle enables the strap to be adjusted to any desired length as required.

The forward portion of the bag, or the feeding compartment $l$ formed thereby, is transversely collapsible, as shown in Figs. 5 and 6, and is adapted to be folded partially around the rear or feed-supply compartment in such a manner that both side walls of the forward or feeding compartment are brought into contact with each other on one and the same side of the feed-supply or rear compartment—the outer side of one of the side walls of the front compartment being in contact with the outer side of the wall of the rear or feed-supply compartment, as shown in Figs. 5 and 6. The discharge passage or opening $k$ between said compartments is thus closed, and the opening at the top of the feed-supply compartment may be opened while said bottom opening is closed, so as to enable the rear compartment to be filled without permitting the grain or feed to escape into the forward compartment, or be otherwise wasted.

When the bag has been filled or supplied with the required quantity of grain or feed, the top opening may be closed, and the feed-containing receptacle will be compact and convenient to handle, and tightly closed both at top and bottom. A strap $q$ which is secured to one side of the body portion of the bag, is adapted to be passed through a loop $r$ on the forward end of the bag and around or partially around the rear compartment or receptacle, said strap being connected with the rear portion of the bag by means of a buckle $s$ which is secured to the bag. This strap is also adapted to engage the nose of the animal and hold the bag in proper relation thereto when the bag is in extended position, as indicated in Fig. 1. When so used, the strap is passed preferably through a buckle $t$, and is released from engagement with the loop $r$ so that its forward portion is above the top of the forward end of the feeding compartment. The strap may thus be adjusted to any desired length as required, and, while buckles are the means which I prefer to use for connecting the otherwise free end of this strap or flexible element with the bag, any ordinary or known means for forming such connections respectively, in such a manner as to permit the same strap to be used in one position as a nose strap and in another position to hold the collapsed transversely folded forward portion of the bag in position to close the bottom opening in the rear or feed-supply compartment may be employed.

It will be noted that the reinforce $d$ only extends back to a point adjacent to the partition $e$ or the opening $k$, at which point it is desirable that the bag should be transversely flexible. This permits the bag to be collapsed and readily folded at a point adjacent to said opening so as to tightly close the latter, and the desired greater degree of rigidity of the forward bottom portion or reinforce beneath the front compartment, as compared with the relatively more flexible rear bottom reinforcing portion or seam is thus obtained.

The branches of the forked reinforcing bottom seam $c$ converge back of and near the rear end of the reinforcing strip $d$, so that the bottom of the bag is reinforced by two converging seam portions or branches of the seam $c$ and the tapered reinforcing strip $d$ and similarly tapered bottom portion $u$ along the opposite side edges of which the forwardly and laterally diverging seam portions extend. The bottom of the bag thus becomes gradually wider from the point of convergence of the bottom seam portions forward. The downward and forward flow of the grain or feed thereby facilitated, the relative rigidity of the forward portion of the bag increased and the desired transverse or lateral flexibility at the point adjacent to the partition bottom or opening $k$ is preserved.

I claim:—

1. In a feed bag, the combination of a main body portion formed of flexible material and having a rear feed-supply compartment and a front feeding compartment provided with a connecting passage therebetween, a transversely flexible bottom reinforcing rib extending longitudinally of the bag beneath said compartments and having a relatively rigid portion forward of said connecting passage and a relatively flexible portion adjacent to the passage, adapted to permit the side walls of the front compartment to be folded laterally into position to close said passage, and means for securing the bag in folded position.

2. In a feed bag, the combination of a main body portion formed of flexible material and having front and rear compartments provided with a connecting passage therebetween, said rear compartment having an opening in the upper portion thereof, above the level of said connecting passage, means for closing said upper opening, a strap secured to the upper portions of the opposite sides of the bag for suspending it, and a strap adapted to extend above the forward portion of the front compartment, for engaging an animal's nose, in one position, and adapted to engage the sides of the rear compartment and hold the forward portion of the bag folded in position to close said bottom passage, in a second position.

3. In a feed bag, the combination of a main body portion formed of flexible material, a partition dividing the bag into front and rear compartments having a connecting passage therebetween, the rear compartment having an opening at the top, means for closing said top opening, means for suspending the bag, a transversely flexible reinforcing rib comprising forwardly and laterally diverging forked seam portions extending longitudinally of the bag and adapted to permit the forward portion of the bag to be folded laterally into position to close the connecting passage, and means for securing the forward foldable portion of the bag in passage-closing folded position.

4. In a feed bag, the combination of a main body portion formed of flexible material and provided with front and rear compartments having a connecting passage therebetween, the portion of the bag forming the front compartment being foldable laterally into position to engage the side of the rear compartment and close said passage, and means for securing the bag in folded passage-closing position.

5. In a feed bag, the combination of a main body portion formed of flexible fabric, a piece of fabric sewed to the main body portion and dividing the bag into front and rear compartments having an opening therebetween, said latter piece of fabric forming a cover for the rear compartment, the portion of the bag forming the front compartment being adapted to be folded laterally into position to close the opening between the said front and rear compartments, and means for securing said foldable forward portion of the bag in folded position.

WILLIS J. RAYBURN.

Witnesses:
HARRY IRWIN CROMER,
GEORGE H. REES.